(12) United States Patent
Britton

(10) Patent No.: US 7,689,298 B2
(45) Date of Patent: Mar. 30, 2010

(54) METHODS TO SUPPORT PROCESS QUALITY AND MAINTENANCE DURING CONTROL OF AN INDUSTRIAL PROCESS SUCH AS WELDING

(76) Inventor: David R. Britton, 31930 S. River Rd., Harrison Township, MI (US) 48045

( * ) Notice: Subject to any disclaimer, the term of this patent is extended or adjusted under 35 U.S.C. 154(b) by 83 days.

(21) Appl. No.: 11/788,163

(22) Filed: Apr. 19, 2007

(65) Prior Publication Data
US 2007/0198105 A1 Aug. 23, 2007

Related U.S. Application Data

(62) Division of application No. 11/027,167, filed on Dec. 30, 2004, now Pat. No. 7,289,862.

(60) Provisional application No. 60/534,429, filed on Jan. 7, 2004.

(51) Int. Cl.
*G06F 19/00* (2006.01)
(52) U.S. Cl. .................. 700/51; 700/110; 700/108; 702/179
(58) Field of Classification Search .............. 700/101, 700/109–111, 115, 96, 166, 223–226; 219/130.01; 709/230
See application file for complete search history.

(56) References Cited

U.S. PATENT DOCUMENTS

| | | | |
|---|---|---|---|
| 4,894,908 A | 1/1990 | Haba et al. | |
| 5,255,197 A * | 10/1993 | Iida | ............................ 700/108 |
| 5,406,044 A | 4/1995 | Killian et al. | |
| 5,676,867 A | 10/1997 | Van Allen | |
| 5,808,885 A | 9/1998 | Dew et al. | |
| 6,441,342 B1 * | 8/2002 | Hsu | ....................... 219/130.01 |
| 6,445,969 B1 | 9/2002 | Kenney et al. | |
| 6,622,286 B1 * | 9/2003 | Ngo et al. | ....................... 716/1 |
| 6,784,786 B1 * | 8/2004 | Sumner | .................... 340/10.32 |
| 6,801,821 B2 * | 10/2004 | Madden et al. | ............. 700/101 |
| 6,917,845 B2 | 7/2005 | Hsiung et al. | |
| 6,931,298 B1 | 8/2005 | Chang | |
| 6,954,678 B1 | 10/2005 | Phan et al. | |
| 6,957,186 B1 | 10/2005 | Guheen et al. | |
| 6,993,404 B2 | 1/2006 | Lev-Ami et al. | |
| 7,200,448 B2 * | 4/2007 | Cachat et al. | .................. 700/18 |

(Continued)

OTHER PUBLICATIONS

Slalom Services, Inc., Cutter and Gun Life Tracking, pp. 1-2.
Slalom Services, Inc., Windows 98/NT WSS Stepper Monitor, pp. 1-2.
Slalom Services, Inc., WSS Backup Server& Enhancements, pp. 1-3.

*Primary Examiner*—Kidest Bahta
(74) *Attorney, Agent, or Firm*—Brooks Kushman P.C.

(57) ABSTRACT

A number of methods to support process quality and maintenance during control of an industrial process such as welding are provided. The methods provide, among other things: automatic process limit programming based on runtime data; user-initiated process limit programming based on upcoming data; correlate equipment deterioration based on capability measurement; correlate tip dressers/formers to new; detect electrical deterioration; integrate process data with programmed data for a visual aid; and quantify process variation in welding tools (pareto of stddev of the c-factor).

5 Claims, 1 Drawing Sheet

U.S. PATENT DOCUMENTS

| | | |
|---|---|---|
| 7,266,425 B2 * | 9/2007 | Bhatt et al. .................. 700/251 |
| 7,289,862 B2 * | 10/2007 | Britton ....................... 700/110 |
| 2002/0198618 A1 * | 12/2002 | Madden et al. ............. 700/101 |
| 2004/0049297 A1 | 3/2004 | Card et al. |
| 2005/0119785 A1 | 6/2005 | Magill et al. |
| 2005/0222817 A1 | 10/2005 | Achacoso et al. |

* cited by examiner

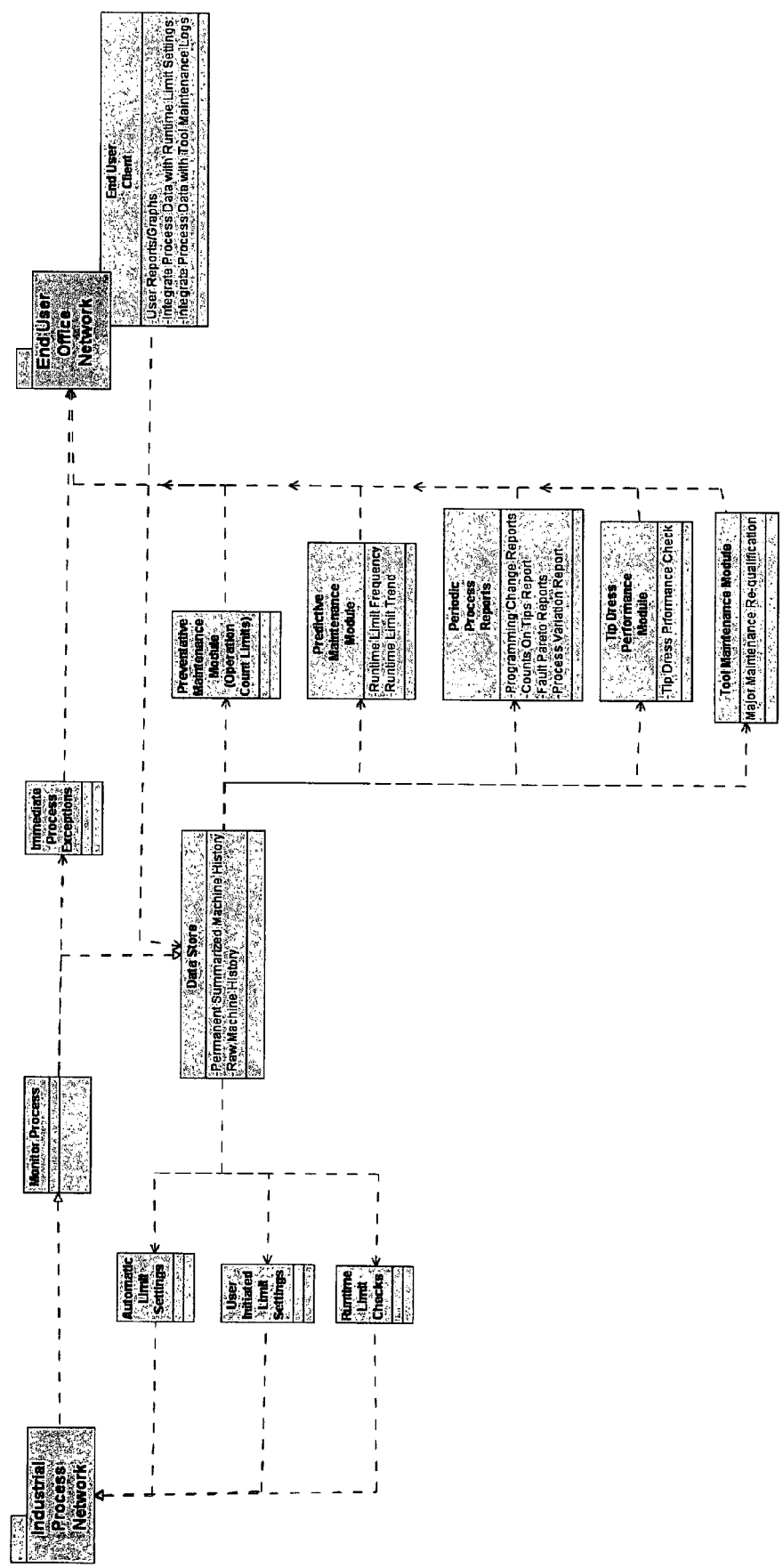

METHODS TO SUPPORT PROCESS QUALITY AND MAINTENANCE DURING CONTROL OF AN INDUSTRIAL PROCESS SUCH AS WELDING

CROSS-REFERENCE TO RELATED APPLICATION

This application is a division of U.S. Ser. No. 11/027,167 entitled "Methods to Support Process Quality and Maintenance During Control of an Industrial Process Such as Welding" filed Dec. 30, 2004 now U.S. Pat. No. 7,289,862 which claims the benefit of U.S. provisional application Ser. No. 60/534,429 entitled "Methods to Support Process Quality and Maintenance," filed Jan. 7, 2004.

BACKGROUND OF THE INVENTION

1. Field of the Invention

This invention relates to methods to support process quality and maintenance during control of an industrial process such as welding.

2. Background Art

Traditionally, large-scale resistance welding networks for use in assembly facilities can cost between $250,000 and $900,000 to install, not including configuration. U.S. Pat. No. 5,808,885 discloses a weld controller coupled to a communications network which has an operator interface unit for monitoring and controlling the weld controller and other weld controllers on the network. A common database in the operator interface unit is accessible across the communications network by the weld controller. The weld controller can use the database to obtain different weld schedules, duplicate its own weld schedule to provide for easy replacement, and as a data storage for its operating parameters and values. The weld controller has a dual communications port that allows for a variety of operator interface configurations. Data from the weld controller can be accessed by the operator interface controller based upon the weld controller's individual data structure and type through embedded objects resident in the operator interface's operating system and program. The data can then be displayed, edited, and stored by any data entry device that is capable of executing the operator interface's program.

The promise of these welding networks is cost savings and better control of the facility. These networks, however, typically fall short of their expectations, become "Boat Anchors" and fall into disuse or are used as nothing more than central programming stations. There are several reasons that these networks fall short of expectations.

Islands of Automation

The network hosts that are typically provided are islands of automation. They provide access at one or at best a limited number of terminals available in the plant.

Require Active Management

Existing networks have no means for informing the user of an existing or pending problem. The user must know that a problem exists or review the data at the network terminal regularly in order to determine whether action is required.

Do Not Provide Data Reduction

No means for automatic data reduction is provided. Often the user is required to wade through mountains of meaningless faults and events to determine what is relevant.

No Process Control Support

Existing networks tend to be organized around the weld control and not the process. This is not surprising since existing welding networks are the products of the welding control companies, but it is not acceptable. Much more useful from a process standpoint are facility-wide reports and data presentation.

No Administrative Support

Existing networks provide no tools for administration of the plant. They provide no assistance in configuration and administering the welding network on a plant-wide basis. No facilities for limit-setting or auditing are provided.

No Maintenance Support

No facilities for predictive or preventative maintenance are provided. At best, one can look at the stepper status and determine if the caps require changing. In addition, there are no facilities for determining the degradation or the capability of the system at any point in time.

No Quality Systems Support

Existing networks provide no support for quality systems. There are no facilities for change control, maintaining mandated quality information or auditing the system for compliance.

Once the user tumbles into these shortfalls, the network becomes much less useful and the systems falls into disuse.

For instance, if the network does nothing to assist with maintenance, the user has no choice but to reactively address problems reported from the floor. Once the problem is reported, the clock is ticking, as there is probably downtime associated with it. There is no need to locate a network terminal and consult it, as this will most likely only increase the downtime. The most effective course is to go directly to the site of the problem, determine its cause and repair it. This totally leaves the network out-of-the-loop.

Other than providing centralized programming, the existing network solutions do little to simplify the user's tasks. As such, they quickly fall into disuse and become an expensive "Boat Anchor."

SUMMARY OF THE INVENTION

An object of the present invention is to provide methods to support process quality and maintenance during control of an industrial process such as welding.

In carrying out the above object and other objects of the present invention, a method for enhancing the quality of a process controlled by a controller including at least one program having a process limit corresponding to a variable of the process is provided. The controller controls the process, monitors the variable and generates data corresponding to the monitored variable. The method includes collecting the data, and processing the collected data to obtain statistical information which provides a history of the process variable. The method also includes generating a signal based on the statistical information, and automatically programming the process limit based on the signal.

The process may be a weld process.

The step of programming may adjust the process limit.

The data may include average RMS current or power factor or firing angle data, or may include electrical impedance data.

The method may further include determining when the process limit falls outside a desired range of process limits.

The method may further include reporting when the process limit falls outside the desired range.

The method may further include determining whether the process limit is reasonable based on the statistical information.

An end user may be capable of scheduling the step of automatically programming based on new collected data after a predefined amount of time.

An end user may be capable of scheduling the step of automatically programming after a predefined amount of data is collected.

Further in carrying out the above object and other objects of the present invention, a method for determining the condition of equipment used to perform a process controlled by a controller including at least one program is provided. The controller controls the equipment, monitors a variable associated with the process and generates data corresponding to the monitored variable. The method includes collecting the data including data which corresponds to a recent value of the monitored variable. The method further includes processing the collected data to obtain statistical information which provides a history of the process variable including the recent value of the process variable. The method still further includes processing the statistical information to determine the condition of the equipment based on the monitored variable.

The method may further include summarizing the collected data on a periodic basis to provide a history of the variable.

The process may be a weld process.

The data may include electrical impedance data.

The equipment may include electrode tips.

The step of processing the statistical information may compare the electrical impedance of the equipment with new electrode tips to dressed or formed electrode tips.

The equipment may include an electrical circuit, and the step of processing the statistical information may include the step of determining a need for maintaining the electrical circuit. The method may further include generating a signal when a need for maintenance is determined.

The step of determining may include the step of detecting the number of run time limits on the electrical impedance. The signal may be generated when the number of run time limits reaches a predetermined number.

The step of determining may include the step of monitoring change of electrical impedance over a predetermined time. The signal may be generated when the change is greater than a predetermined limit over the predetermined time.

Still further in carrying out the above object and other objects of the present invention, a method for visually displaying process data integrated with process limit data programmed in a controller including at least one program having a process limit corresponding to a variable of the process is provided. The controller controls the process, monitors the variable and generates data corresponding to the monitored variable. The method includes collecting the data, and processing the collected data to obtain statistical information which represents a history of the process variable. The method further includes displaying the statistical information together with associated process limits programmed in the controller to provide a visual aid.

The process may be a weld process.

The method may further include displaying annotations related to maintenance of equipment used to perform the weld process.

The data may include electrical impedance data.

Yet still further in carrying out the above object and other objects of the present invention, a method for quantifying an amount of process variation controlled by a controller including at least one program having a process limit corresponding to a variable of the process is provided. The controller controls the process, monitors the variable, or is able to derive the variable, and generates data corresponding to the monitored variable. The method includes collecting the data including data which corresponds to a recent value of the monitored variable. The method further includes processing the collected data to obtain statistical information which provides a measurement of the process variation.

The process may be a weld process.

The data may include electrical impedance data.

Portions of a process facility may be analyzed by reporting standard deviation of electrical impedance over a period of interest to determine the amount of process variation related to welding.

Still further in carrying out the above object and other objects of the present invention, a method for quantifying the number of operations in a set of process consumables controlled by a controller including at least one program having a set of consumables corresponding to a count variable of the process is provided. The controller controls the process, monitors the variable, or is able to derive the variable, and generates data corresponding to the monitored variable. The method includes collecting the data including data which corresponds to a recent value of the monitored variable. The method further includes processing the collected data to obtain statistical information which provides a measurement of the life of the consumables.

The process may be a weld process.

The data may include operation count data.

The consumables may include a set of welding electrodes.

Portions of a process facility may be analyzed by reporting the total number of process counts over a period of interest to determine the amount of operations on the consumable.

Further in carrying out the above object and other objects of the present invention, a method for integrating process information controlled by a controller to a process facility infrastructure is provided. The controller includes at least one program. The controller controls equipment used to perform the process, monitors a variable associated with the process and generates data corresponding to the monitored variable. The method includes collecting the data, processing the collected data to obtain electronic process reports, and periodically sending the electronic process reports to end users.

The process may be a weld process.

The data may include process control data.

The periodic process reports may represent the state of a facility or zone and may be automatically generated during the step of processing.

The periodic process reports may be sent seamlessly by the facility infrastructure.

The facility infrastructure may include an electronic email system, or may include an electronic paging system.

The above object and other objects, features, and advantages of the present invention are readily apparent from the following detailed description of the best mode for carrying out the invention when taken in connection with the accompanying drawings.

BRIEF DESCRIPTION OF THE DRAWINGS

The drawing FIGURE is a block diagram illustrating an industrial process network, an end user office network, and various settings, checks, modules, and reports of one embodiment of the present invention in order to provide, for example, preventative and predictive maintenance and system support for weld quality.

DETAILED DESCRIPTION OF THE PREFERRED EMBODIMENTS

In general, the present invention relates generally to the area of industrial process monitoring. Various embodiments of the present invention relate to:

Automatic process limit programming based on runtime data;

Correlate equipment deterioration based on capability measurement;

Tip dress/former performance;

Predictive maintenance;

Integrate process data with programmed and maintenance data for visual aid.

As described hereinbelow, each area has been implemented as it pertains to resistance welding equipment, but the general principles can be provided to any process control equipment.

Automatic Process Limit Programming Based on Runtime Data

This invention collects runtime data from a process controller via a data network, measuring certain characteristics of a process. It then can analyze historical process data to determine if runtime limits within the process controller are set to reasonable guidelines. The invention has the capability to report process runtime variable limits that are outside suggested guidelines. The invention also has the capability to automatically set the process runtime limits for the variables in question. Often, controllers can run individual programs. This invention can segregate the analysis/reporting and automatic setting of process variables on a program basis. This invention allows end users to ensure that they are fully utilizing the runtime process limits available in the controller and provides automated setup of such.

One specific embodiment of the invention uses a resistance-welding network to measure and record resistance-welding variables during the production process. There variables were analyzed to get statistical information describing the process. Some of the process variables have corresponding welding control runtime limits. Historical process data is automatically analyzed to determine suggested runtime limits. The system is then enabled to automatically program the welding controller to the successive limits. Welding controls have a range of programs (called schedules or sequences) that can be initiated to perform their operation. The weld data is analyzed on a schedule basis to program the corresponding schedule runtime limits in the welding control.

Process variables are statistically sampled to provide a permanent history of the control/process operation. An automatic mechanism is provided that can be triggered to analyze the process variable history to determine normal/average operation. The automated tool will then provide runtime limits on the process variables that are then programmed via a network into the process control itself.

The resistance welding process variables are monitored such as the average RMS current, power factor, firing angle and the current capability (Electrical Impedance, C-factor, Imax or Imeasured/% I) for each welding schedule. In this implementation, one controls the trigger to initiate the automatic runtime limit programming. When the trigger is received, all or a sub-set of, the welding controls on the network get their runtime limits adjusted based on the historical data collected.

In Exhibit A there is shown an example of a welding control named "ARS_W01" on the date Nov. 10, 2003. Data is categorized by the schedules used by the welder. Each line represents data pertinent for the welder's respective schedule. The header for the data in Exhibit A is defined below.

welder date seq avg high low samples std ulimit llimit sulimit sllimit spercent Iavg Ihigh Ilow Istd Iulimit Illimit Isulimit Isllimit Ispercent where:

welder=name of the welder date=date of statistical data seq=sequence, schedule or program id the data is associated to in the welder avg=average c-factor high=high c-factor low=low c-factor samples=number of data samples in the group std=c-factor standard deviation ulimit=c-factor programmed upper runtime limit llimit=c-factor programmed for lower runtime limit sulimit=suggested c-factor programming for the upper runtime limit sllimit=suggested c-factor programming for the lower runtime limit spercent=suggested percentage (used to determine sulimit & sllimit)

Iavg=average welding current

Ihigh=high welding current

Ilow=low welding current

Istd=welding current standard deviation

Iulimit=weld current programmed upper runtime limit

Illimit=weld current programmed lower runtime limit

Isulimit=suggested welding current programming for the upper runtime limit

Isllimit=suggested welding current programming for the lower runtime limit

Ispercent=suggested welding current percentage (used to determine Isulimit & Isllimit)

Exhibit A welder date seq avg high low samples std ulimit llimit sulimit sllimit spercent Iavg Ihigh Ilow Istd Iulimit Illimit Isulimit Isllimit Ispercent ARS_W01 Nov. 10, 2003 01 211.14 217 202 253 1.52 240 195 242 179 15 9871.83 10143 9450 95.23 22000 08000 11352 8391 15

ARS_W01 Nov. 10, 2003 02 215.15 15 224 205 197 2.77 245 195 247 182 15 11351.51 11844 10836 170.33 22000 08000 13054 9648 15

ARS_W01 Nov. 10, 2003 03 217.22 222 206 200 1.71 247 195 249 184 15 11448.67 11718 10899 115.53 22000 09500 13165 9731 15

ARS_W01 Nov. 10, 2003 04 213.11 219 203 101 1.91 244 195 245 181 15 10812.92 11088 10269 122.74 22000 08000 12434 9190 15

ARS_W01 Nov. 10, 2003 05 213.21 217 208 48 1.23 244 195 245 181 15 10391.06 10584 10143 80.58 22000 09500 11949 8832 15

ARS_W01 Nov. 10, 2003 16 259.42 262 258 79 0.29 300 120 272 246 5 12916.59 13041 12789 27.51 18000 11500 13562 12270 5

For further review, consider the report above for seq 16 (last line). The average c-factor for the seq is 259.42 and the current runtime limits are set to:

C-factor limits Hi: 300 Lo: 120

To enforce a 5% window around the average, the automated tool will change the runtime limits to:

C-factor limits Hi: 272 Lo: 246

Similarly, the average current for seq 16 is 12916.59. The current limits will be change from:
Current limits—Hi: 18000 Lo: 11500
To
Current limits—Hi: 13562 Lo: 12270.

The automatic edit and download of the welding control runtime limits was implemented on Feb. 25, 2003. Historical data is analyzed over periods of weeks, days or intra-day depending on the circumstances.

Correlate Equipment Deterioration Based on Current Capability Measurement

Tip Dress/Former Performance

The electrode tips of a resistance welding control can degrade based on operation counts. Often, a strategy of dressing or reforming the tips is applied to lengthen the number of operations the electrode tips can support. Controlling the shape of the electrodes is also desired to provide process consistency. This invention provides a method to measure the performance of tip dressers or tip formers as compared to brand new tips.

The current capability of the machine is compared with new electrode tips to dressed/formed tips. In this implementation, the strategy of doing new tip firings in schedule 13 and tip dress firings in schedule 16 enables one to compare the difference in current capability for the two different conditions. In other words, after new electrode tips are put on the tool, schedule 13 is fired and associated data collected to get a new tip condition signature. After the tips are conditioned (dressed, formed or both), a tip-dress burn-in weld is performed and the associated data is collected for its signature. Both of these firings are done tip-to-tip, with no welding work between the tips. This allows one to eliminate any variances from the manufactured work. Welding control BDY-_FRM_W03 shows good tip dress performance, the tip dress current capability is very close to the new tip current capability. The BS_RH_IN_W08 welder tip dress operation is not bringing the characteristics of the tips back to the new shape. This is evidenced by the difference in the current capability for the new tips versus the current capability of the dressed tips.

Predictive Maintenance

By analyzing changes in a welding controls current capability, one can detect changes in its electrical circuit. These changes can indicate process problems or circuit deterioration/shorting conditions.

The present invention has successfully detected the need for maintenance (predictive maintenance) by analyzing historical/daily current capability data gathered by a welding network. One can determine the need for maintenance by two methods. The first is if a programmable number of runtime limits on the current capability of the welding control is detected within a programmable period, one can flag maintenance required. The second is by monitoring the slope of the current capability. If the slope of the current capability becomes greater than a programmable limit, then one can flag maintenance required.

This implementation takes advantage of a periodic tip-to-tip firing, which will be called tip-dress burn-in. Under this condition, the welding control is initiated with a specific schedule and no work in the machine. Thus, the data gathered from this weld eliminates any possible variations that could be caused by the welding work. It been found that one can set the runtime limits much tighter on this schedule than the normal production schedules.

The present invention has successfully detected breaking welding shuts, poor electrical connections, malfunctioning tip dresser, system cooling problems, and burning up connectors days before the condition affected production quality or downtime.

Integrate Process Data with Programmed Data for Visual Aid

This invention integrates the display of runtime process data, runtime limits programmed in the process controller and maintenance annotations. This integrated display will show historical process data. Runtime limits that were programmed in the control on the respective dates can be represented.

The following are a number of advantageous features of the present invention, many of which are described above, and as illustrated in the drawing:

Automatic process limit programming based on runtime statistical data;
  Global plant initialization of process limit settings;
  User-initiated process limit programming based on upcoming statistical data;
Correlate equipment deterioration based on capability measurement;
Correlate tip dressers/formers to new;
Detect electrical deterioration;
  Waveform analysis;
Integrate process data with programmed data for a visual aid;
Quantify process variation in welding tools (pareto of std-dev of the c-factor for each schedule);
Welding tip pareto report;
  Daily report that shows how many counts each weld tip consumable provides;
Permanent storage of process data;
Periodically check that process limits have not been jeopardized;
  SPC limits;
  Low current limits;
Seamless integration of the welding network into the customer's office network.

Other features include:
Integrate tool maintenance logs into process data history;
Detect tooling trends by analyzing process maintenance logs and process data;
Containment support: send quality audit warnings on spot numbers/product location;
Programming a spot number, what else does it effect? (Groups: similar tips and part location).

The following are additional advantageous features:
Push technology;
Real-time c-factor monitor—interfaced to plant paging systems;
Visual indications of the welding steppers percent complete for zones in the plant;
Allowing count limits and displaying visual representations of such counts;
  for weld guns,
  for tip dressers;
Providing a log of welding event data;
Change control; and
Integrating change control with quality policy.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for determining the condition of equipment controlled by a plurality of controllers on an industrial process network within a plant, each of the controllers controlling a resistance weld process performed by its respectively controlled equipment and each of the controllers including at least one program, each of the controllers: controlling corresponding equipment; monitoring a variable associated with a corresponding controlled resistance weld process and generating electrical impedance data corresponding to the corresponding monitored variable, the method comprising:

utilizing the network to collect the electrical impedance data corresponding to each of the monitored variables over a period of time including data which corresponds to a recent value of each of the monitored variables from each of the controllers within the plant;

processing the collected electrical impedance data to obtain statistical information which provides a history of each of the process variables including recent values of the process variables for each of the controllers; and processing the statistical information to determine the condition of the equipment within the plant and controlled by each of the controllers based on the history and recent values of each of the monitored variables wherein the step of processing the statistical information compares the electrical impedance of the equipment with new electrode tips to dressed or formed electrode tips to determine if a tip dresser or tip former of a resistance welder is operating properly.

2. The method as claimed in claim 1, further comprising summarizing the collected data on a periodic basis to provide the history of the variable.

3. The method as claimed in claim 1, wherein the equipment includes an electrical circuit and wherein the step of processing the statistical information includes the step of determining a need for maintaining the electrical circuit and wherein the method further comprises generating a signal when a need for maintenance is determined.

4. The method as claimed in claim 3, wherein the step of determining includes the step of detecting the number of run time limits on the electrical impedance wherein the signal is generated when the number of run time limits reaches a predetermined number.

5. The method as claimed in claim 3, wherein the step of determining includes the step of monitoring change of electrical impedance over a predetermined time wherein the signal is generated when the change is greater than a predetermined limit over the predetermined time.

* * * * *